(12) United States Patent
Marshall

(10) Patent No.: US 9,073,487 B1
(45) Date of Patent: Jul. 7, 2015

(54) EXTENDABLE VEHICLE LOAD FLOOR MOUNTING ASSEMBLY AND METHOD

(71) Applicant: Daniel James Marshall, Medford, OR (US)

(72) Inventor: Daniel James Marshall, Medford, OR (US)

(*) Notice: Subject to any disclaimer, the term of this patent is extended or adjusted under 35 U.S.C. 154(b) by 0 days.

(21) Appl. No.: 13/753,871

(22) Filed: Jan. 30, 2013

(51) Int. Cl.
*B60R 5/00* (2006.01)
*B60R 5/04* (2006.01)
*B62D 65/02* (2006.01)

(52) U.S. Cl.
CPC ............... *B60R 5/041* (2013.01); *B62D 65/02* (2013.01)

(58) Field of Classification Search
CPC ................................ B60R 5/041; B62D 65/02
USPC ................................ 296/26.09, 26.08, 26.01
See application file for complete search history.

(56) References Cited

U.S. PATENT DOCUMENTS

| | | | |
|---|---|---|---|
| 6,328,364 B1 * | 12/2001 | Darbishire | 296/26.09 |
| 6,390,525 B2 | 5/2002 | Carpenter et al. | |
| 6,959,955 B2 * | 11/2005 | Carter et al. | 296/37.6 |
| 7,175,060 B1 | 2/2007 | Carpenter et al. | |

* cited by examiner

*Primary Examiner* — Joseph D Pape
(74) *Attorney, Agent, or Firm* — Jerry Haynes Law

(57) ABSTRACT

An extendable vehicle load floor mounting assembly for attachment to a vehicle cargo space floor having a plurality of factory bolt openings includes a base frame, a plurality of bolt flanges carried by the base frame and a plurality of flange bolt openings in the bolt flanges, respectively. The flange bolt openings in the bolt flanges are configured to correspond in position to the factory bolt openings, respectively, in the vehicle cargo space floor. A plurality of bolts are adapted for extension through the flange bolt openings and the factory bolt openings, respectively. An extendable vehicle load floor is slidably carried by the base frame.

10 Claims, 5 Drawing Sheets

EXTENDABLE VEHICLE LOAD FLOOR MOUNTING ASSEMBLY AND METHOD

FIELD OF THE INVENTION

Illustrative embodiments of the disclosure generally relate to assemblies for mounting an extendable load floor to a vehicle. More particularly, illustrative embodiments of the disclosure relate to a mounting assembly and method in which an extendable vehicle load floor is attached to a pickup truck bed using vehicle factory attachment points and hardware.

BACKGROUND OF THE INVENTION

Vehicles that are used for transporting equipment, supplies, or other items within enclosed areas such as, for example, a pickup truck with a canopy covering the bed or a motorhome having storage compartments under the living area, can hold more items than are easily accessible. For example, if a person fills a canopy covered pickup bed with tools, the tools near the tailgate are more easily accessible than tools near the front of the bed (e.g., behind the cab of the truck). Other types of storage areas associated with other types of vehicles suffer from similar shortcomings.

One solution to the problem of accessing items in storage areas is the use of an extendable load floor. Extendable load floors typically include a base frame which may be attached to the storage area of a vehicle such as the bed of a pickup truck, for example, using fasteners. The fasteners may be extended through registering fastener openings at multiple locations in the base frame and the pickup truck bed, respectively. However, this method may require that fastener openings be drilled into the pickup truck bed at the locations which correspond to the locations of the fastener openings in the base frame, potentially breaking the paint of the vehicle and causing acceleration of rust in the vehicle.

Accordingly, a mounting assembly and method in which an extendable vehicle load floor is attached to a pickup truck bed using vehicle factory attachment points and hardware are desirable.

SUMMARY OF THE INVENTION

Illustrative embodiments of the disclosure are generally directed to an extendable vehicle load floor mounting assembly for attachment to a vehicle cargo space floor having a plurality of factory bolt openings. An illustrative embodiment of the assembly includes a base frame, a plurality of bolt flanges carried by the base frame and a plurality of flange bolt openings in the bolt flanges, respectively. The flange bolt openings in the bolt flanges are configured to correspond in position to the factory bolt openings, respectively, in the vehicle cargo space floor. A plurality of bolts are adapted for extension through the flange bolt openings and the factory bolt openings, respectively. An extendable vehicle load floor is slidably carried by the base frame.

Illustrative embodiments of the disclosure are further generally directed to extendable vehicle load floor mounting method. An illustrative embodiment of the method includes providing a vehicle having a vehicle cargo space with a cargo space floor and factory bolt openings in the cargo space floor; providing a base frame having bolt flanges and flange bolt openings in the bolt flanges, the flange bolt openings in the bolt flanges are configured to correspond in position to the factory bolt openings, respectively, in the cargo space floor of the vehicle cargo space; removing bolts from the factory bolt openings in the cargo space floor of the vehicle cargo space; aligning the flange bolt openings in the bolt flanges with the factory bolt openings, respectively, in the cargo space floor; extending the bolts through the flange bolt openings and the factory bolt openings, respectively; securing the bolts in the factory bolt openings; and slidably mounting an extendable vehicle load floor to the base frame.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
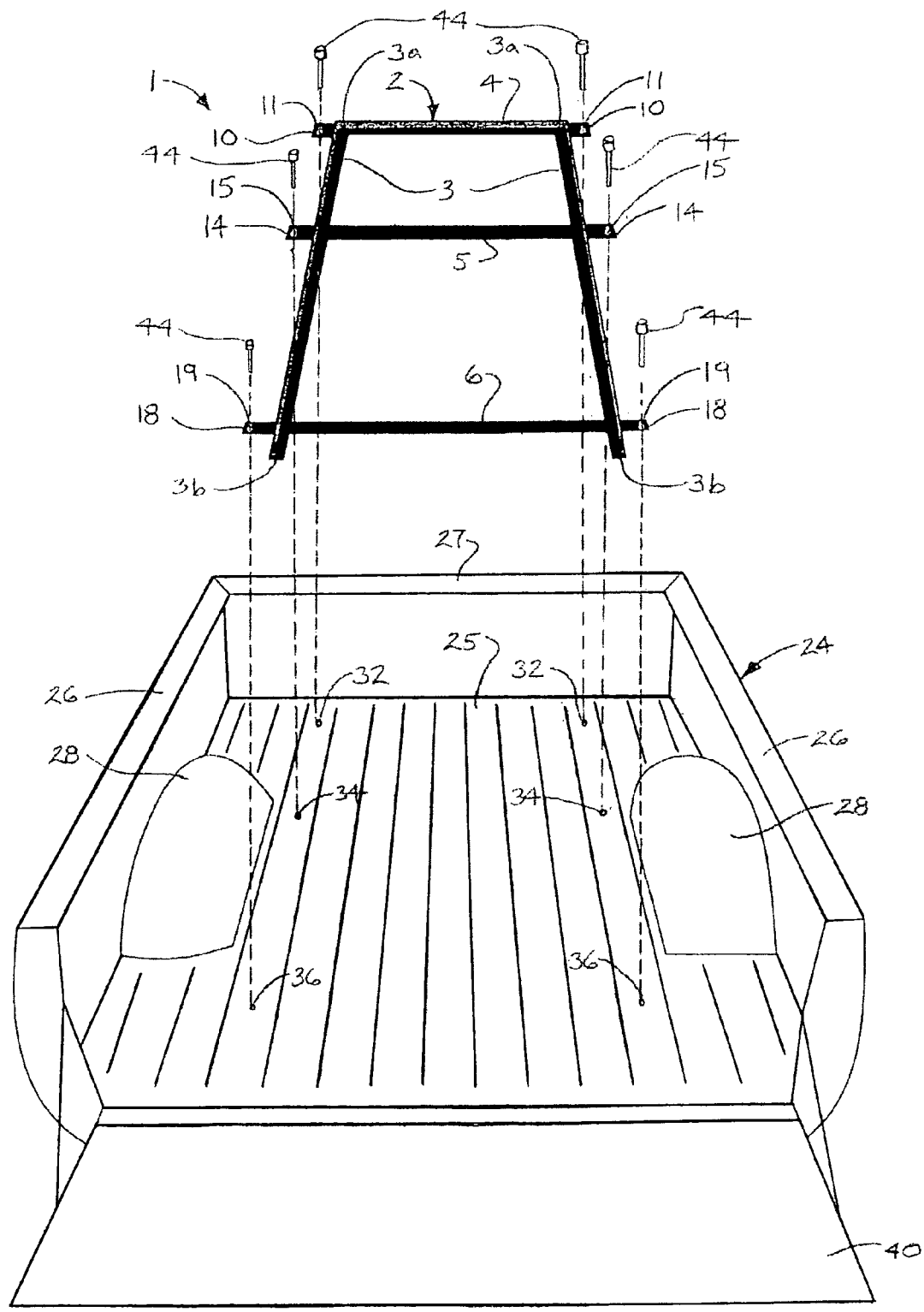
FIG. 1 is an exploded perspective view illustrating an exemplary technique for attaching a base frame to a cargo space floor of a vehicle cargo space according to implementation of an illustrative embodiment of the extendable vehicle load floor mounting assembly.

Referring to the drawings, an illustrative embodiment of the extendable vehicle load floor mounting assembly, hereinafter assembly, is generally indicated by reference numeral 1. As will be hereinafter further described, the assembly 1 facilitates attachment of an extendable vehicle load floor 50 (illustrated in phantom in FIGS. 4 and 5) to a cargo storage area of a vehicle such as a van or a pickup truck, for example and without limitation. As illustrated in the drawings, the assembly 1 may be applicable to a vehicle having a vehicle cargo space 24. In some applications, the vehicle cargo space 24 may be a pickup truck bed having a conventional pickup truck bed design. In other applications, the vehicle cargo space 24 may be a van or other cargo-carrying vehicle. Generally, the vehicle cargo space 24 may have a flat cargo space floor 25 and a pair of upward-standing side walls 26 and a front wall 27 extending from the sides and front, respectively, of the cargo space floor 25. In applications in which the vehicle cargo space 24 is a pickup truck bed, wheel wells 28 may extend inwardly from the respective side walls 26 and a tailgate 40 typically closes the rear end of the vehicle cargo space 24. The assembly 1 is adapted to utilize and interface with industry-standard vehicle factory attachment points and hardware which normally facilitate attachment of the cargo space floor 25 to the frame or chassis (not illustrated) of the pickup truck in attachment of an extendable vehicle load floor 50 (illustrated in phantom in FIGS. 4 and 5) to the vehicle cargo space 24. These industry-standard vehicle factory attachment points and hardware may include factory-equipped front factory bolt openings 32, middle factory bolt openings 34 and rear factory bolt openings 36 in the cargo space floor 25, as illustrated in FIG. 1, as well as bolts 44 which extend through the front factory bolt openings 32, the middle factory bolt openings 34 and the rear factory bolt openings 36 to attach the cargo space floor 25 to the vehicle frame or chassis. Therefore, the assembly 1 facilitates attachment of the extendable vehicle load floor 50 to the vehicle cargo space 24 without the need to drill separate or additional bolt openings and/or provide additional or alternative anchoring points, fasteners or hardware on the cargo space floor 25 for the purpose.

The assembly 1 includes a base frame 2. The base frame 2 may be steel, aluminum, composite material and/or other suitable material which is consistent with the functional requirements of the assembly 1. The base frame 2 may be generally elongated and rectangular with a pair of generally elongated, parallel, spaced-apart slide rails 3 each having a front rail end 3a and a rear rail end 3b. A transverse slide rail connecting member 4 may connect the slide rails 3 to each other generally at or adjacent to the front rail ends 3a of the respective slide rails 3. A transverse rear frame member 6 may connect the slide rails 3 to each other generally at or adjacent to the rear ends 3b of the respective slide rails 3. A transverse middle frame member 5 may connect the slide rails 3 to each other between the slide rail connecting member 4 and the rear frame member 6. The middle frame member 5 may be disposed about equidistant between the slide rail connecting member 4 and the rear frame member 6. The slide rail connecting member 4, the middle frame member 5 and the rear frame member 6 may be disposed in generally parallel, spaced-apart relationship to each other.

Figure 3:
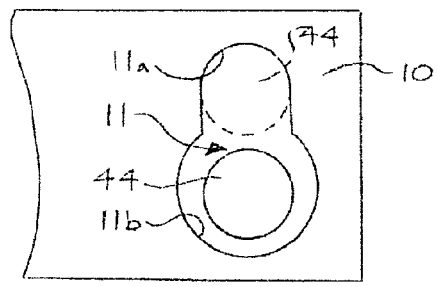
FIG. 3 is a top view, partially in section, of a front bolt flange and a flange bolt opening extending there through according to an illustrative embodiment of the extendable vehicle load floor mounting assembly.
Figure 3A:
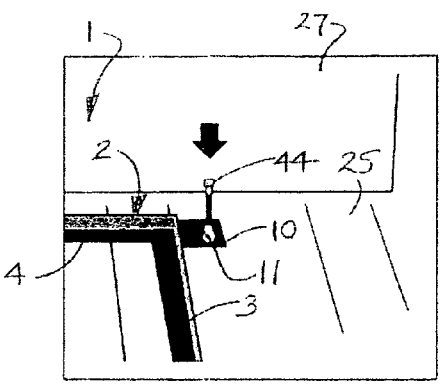
FIG. 3A is an exploded sectional view illustrating insertion of a bolt through a flange bolt opening provided in a bolt flange on the base frame and through a registering factory bolt opening in the cargo space floor in attachment of the base frame to the cargo space floor.
Figure 2:
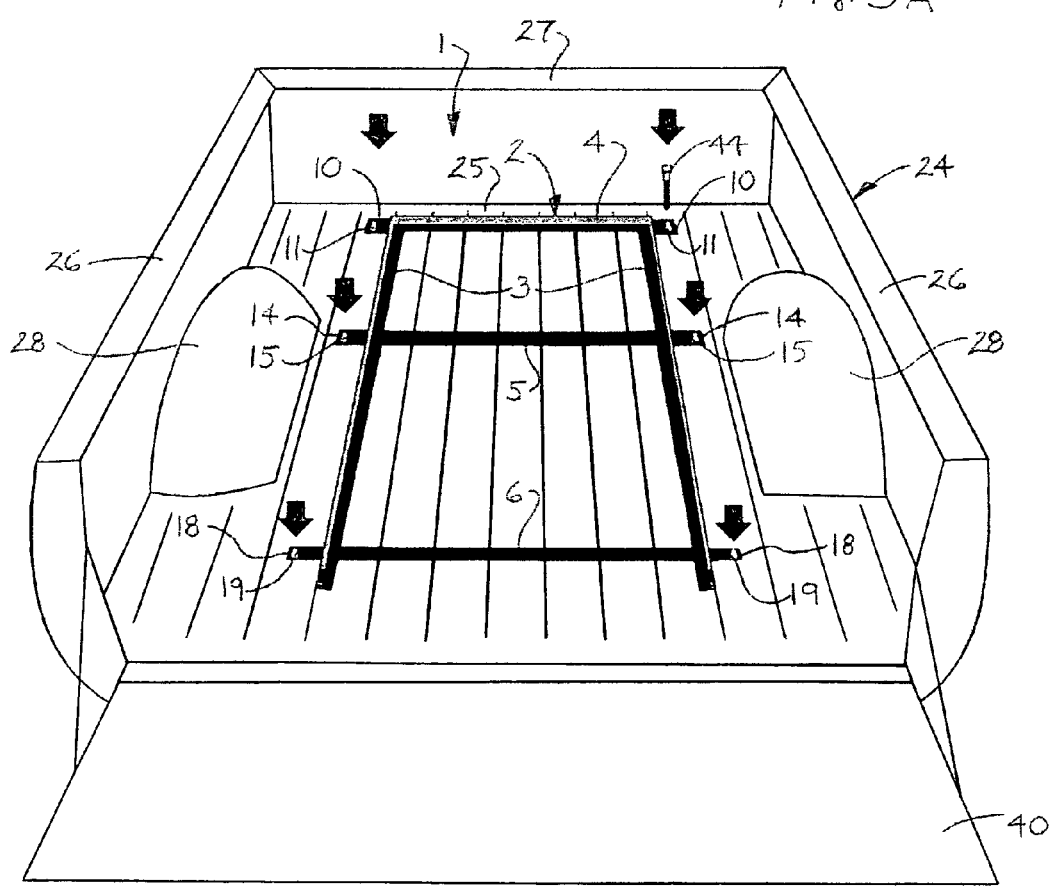
FIG. 2 is a perspective view illustrating attachment of the base frame to the cargo space floor by extension of bolts through flange bolt openings provided in bolt flanges on the base frame and through registering factory bolt openings in the cargo space floor.

A pair of front bolt flanges 10 extends outwardly from the slide rails 3 adjacent to the respective front rail ends 3a and at the opposite ends of the slide rail connecting member 4. A front flange bolt opening 11 extends through each bolt flange 10. A pair of middle bolt flanges 14 extends outwardly from the respective slide rails 3 at the opposite ends of the middle frame member 5. A middle flange bolt opening 15 extends through each middle bolt flange 14. A pair of rear bolt flanges 18 extends outwardly from the respective slide rails 3 at the opposite ends of the rear frame member 6. A rear flange bolt opening 19 extends through each rear bolt flange 18. As illustrated in FIG. 3, in some embodiments, the front flange bolt opening 11 in each of the front bolt flanges 10 may generally have a "FIG. 8" configuration with a narrow portion 11a and a wide portion 11b which communicates with the narrow portion 11a. Each of the middle flange bolt openings 15 and the rear flange bolt openings 19 may have a similar configuration. Each flange bolt opening 11, 15 and 19 may be oriented such that the narrow portion 11a is disposed closer to the front rail end 3a whereas the wide portion 11b is disposed closer to the rear rail end 3b of each slide rail 3. As illustrated in FIG. 1, the front flange bolt openings 11, the middle flange bolt openings 15 and the rear flange bolt openings 19 are configured to correspond in position to the respective front factory bolt openings 32, middle factory bolt openings 34 and rear factory bolt openings 36, respectively, in the cargo space floor 25 of the vehicle cargo space 24.

Figure 4:
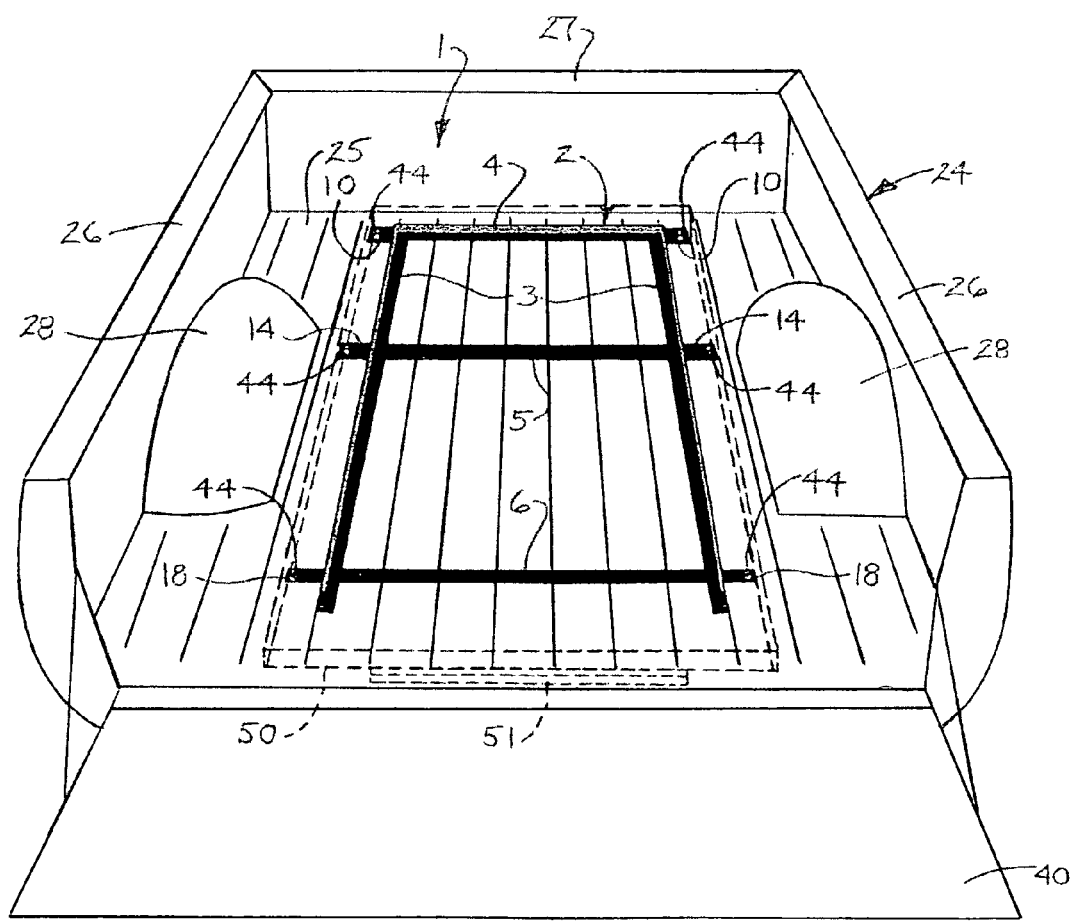
FIG. 4 is a perspective view of the base frame attached to the cargo space floor and an extendable vehicle load floor slidably engaging the base frame, with the extendable vehicle load floor deployed in a retracted position in the vehicle cargo space.
Figure 5:
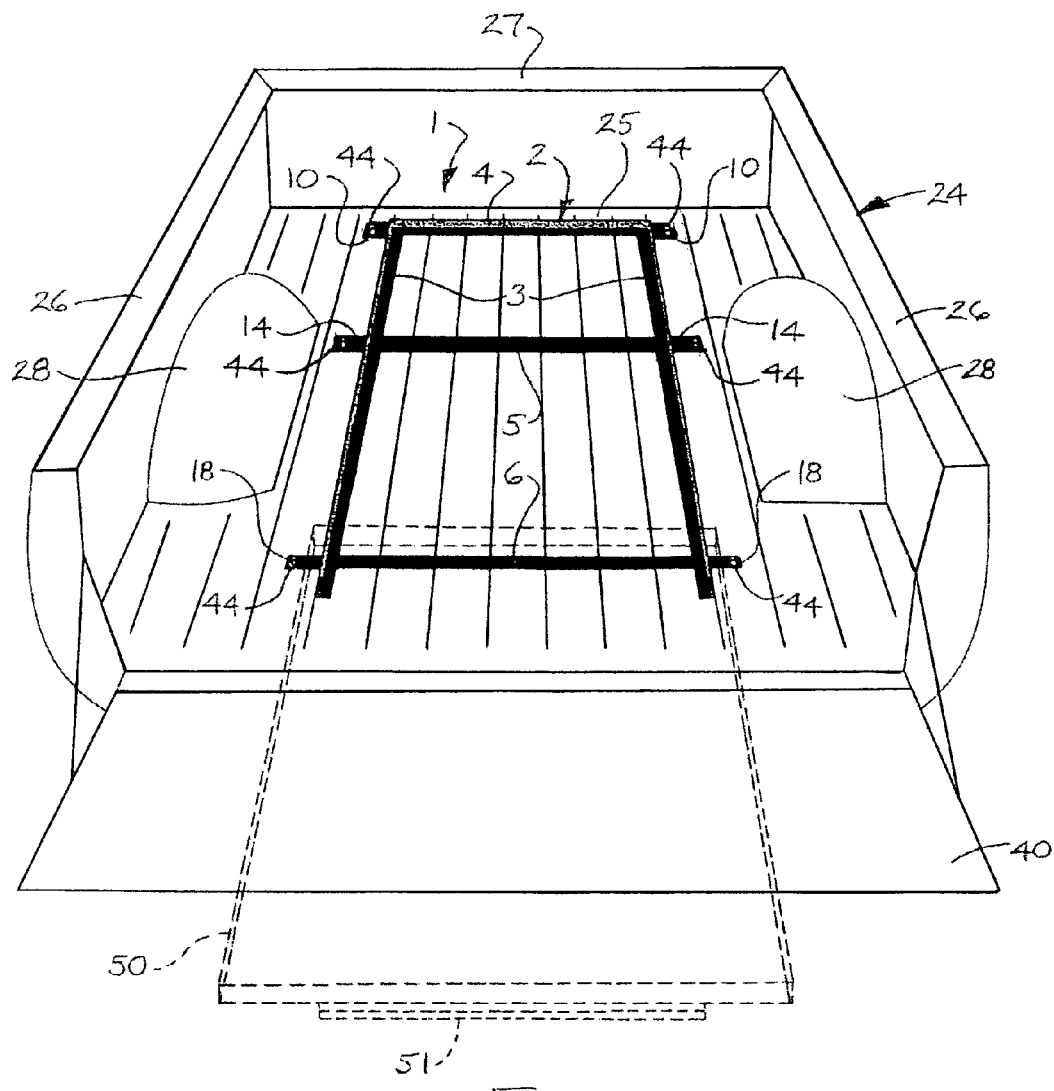
FIG. 5 is a perspective view of the base frame attached to the cargo space floor and an extendable vehicle load floor slidably engaging the base frame, with the extendable vehicle load floor deployed in an extended position from the vehicle cargo space.

The extendable vehicle load floor 50 slidably engages the slide rails 3 of the base frame 2 in such a manner that the vehicle load floor 50 can be selectively deployed in a retracted position in the vehicle cargo space 24 (FIG. 4) or an extended position in which the vehicle load floor 50 extends rearwardly from the vehicle cargo space 24 (FIG. 5). The extendable vehicle load floor 50 may have any of a variety of designs and can be slidably attached to the slide rails 3 of the base frame 2 according to any suitable technique known by those skilled in the art. Exemplary designs for the extendable vehicle load floor 50, as well as suitable techniques for mounting the extendable vehicle load floor 50 to the slide rails 3 of the base frame 2, are set forth in U.S. Pat. Nos. 6,390,525 and 7,175,060, each of which is incorporated by reference herein in its entirety. As illustrated in FIGS. 4 and 5, in some embodiments, a handle 51 may be provided at a rear edge of the extendable vehicle load floor 50 to facilitate selective deployment of the extendable vehicle load floor 50 between the retracted position of FIG. 4 and the extended position of FIG. 5.

The base frame 2 is attached to the cargo space floor 25 of the vehicle cargo space 24 by initially removing the bolts 44 from the respective front factory bolt openings 32, middle factory bolt openings 34 and rear factory bolt openings 36 in the cargo space floor 25. The base frame 2 is rested on the cargo space floor 25 and the front flange bolt openings 11, the middle flange bolt openings 15 and the rear flange bolt openings 19 are registered or aligned with the front factory bolt openings 32, the middle factory bolt openings 34 and the rear factory bolt openings 36, respectively. The bolts 44 are then extended through the front flange bolt openings 11, the middle flange bolt openings 15 and the rear flange bolt openings 19 and the registering front factory bolt openings 32, middle factory bolt openings 34 and rear factory bolt openings 36, respectively. As illustrated in FIG. 3, in some applications, each bolt 44 may initially be extended through the wide portion 11b of each front flange bolt opening 11, each middle flange bolt opening 15 and each rear flange bolt opening 19 and then through the registering underlying factory bolt opening 32, 34, 36, in which the base frame 2 is disposed on an unlocked position on the cargo space floor 25. The base frame 2 may then be shifted on the cargo space floor 25 toward the tailgate 40 to a locked position, locating each bolt 44 from the wide portion 11b to the narrow portion 11a of the corresponding flange bolt opening 11, 15, 19. Securing nuts (not illustrated) may be threaded on the respective bolts 44 to tighten the bolts 44 against the respective front bolt flanges 10, middle bolt flanges 14 and rear bolt flanges 18.

The extendable vehicle load floor 50 may next be assembled on the slide rails 3 of the base frame 2. In some applications, the extendable vehicle load floor 50 may be assembled on the slide rails 3 prior to installation of the base frame 2 in the vehicle cargo space 24. Various items (not illustrated) can be placed on the extendable vehicle load floor 50 for storage and/or transport when the extendable vehicle load floor 50 is deployed in the retracted configuration of FIG. 4 or the extended position of FIG. 5. Items which are located further away from the rear end of the extendable vehicle load floor 50 can be easily accessed by selectively sliding the extendable vehicle load floor 50 from the retracted position illustrated in FIG. 4 to the extended position illustrated in FIG. 5.

Figure 6:
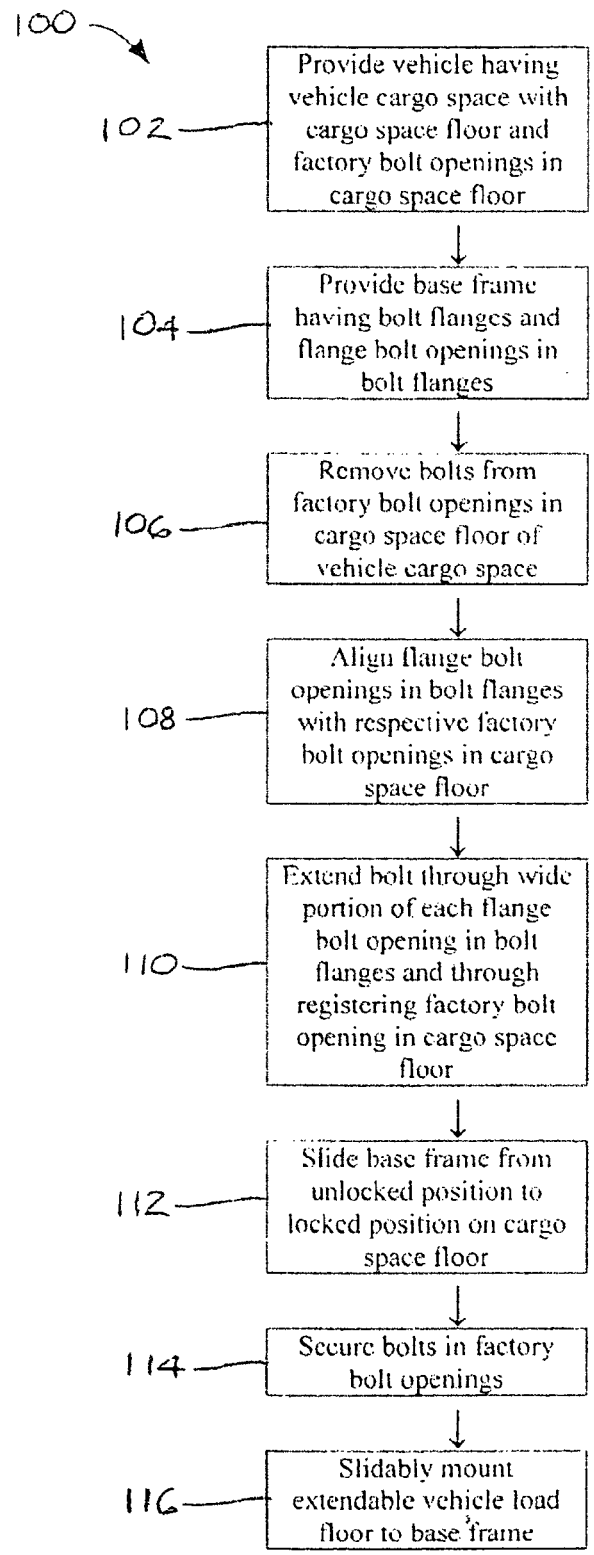
FIG. 6 is a flow diagram of an illustrative embodiment of an extendable vehicle load floor mounting method.

Referring next to FIG. 6 of the drawings, a flow diagram 100 of an illustrative embodiment of a extendable vehicle load floor mounting method is shown. In block 102, a vehicle is provided. The vehicle has a vehicle cargo space with a cargo space floor and industry-standard factory bolt openings in the cargo space floor. In block 104, a base frame having bolt flanges and flange bolt openings in the respective bolt flanges is provided. Each flange bolt opening may have a wide portion and a narrow portion which communicates with the wide portion. The flange bolt openings in the bolt flanges are configured to correspond in position to the respective factory bolt openings in the cargo space floor of the vehicle cargo space.

In block 106, the bolts are removed from the respective factory bolt openings in the cargo space floor of the vehicle cargo space. In block 108, the flange bolt openings in the bolt flanges are aligned with the respective factory bolt openings in the cargo space floor of the vehicle cargo space. In block 110, a bolt is extended through the wide portion of each flange bolt opening in each bolt flange and through the corresponding registering factory bolt opening in the in the cargo space floor of the cargo space such that the base frame is in an unlocked position on the cargo space floor. In block 112, the base frame is slid on the cargo space floor from the unlocked position to a locked position in which each bolt is located in the wide portion of each flange bolt opening to lock the base frame on the cargo space floor. In block 114, the bolts are secured in the factory bolt openings such as by threading and tightening a securing nut on each bolt. In block 116, an extendable vehicle load floor is slidably mounted to the base frame. In some embodiments, the extendable vehicle load floor may be slidably mounted to the base frame prior to attachment of the base frame to the cargo floor.

While the embodiments of the disclosure have been described above, it will be recognized and understood that various modifications can be made and the appended claims are intended to cover all such modifications which may fall within the spirit and scope of the disclosure.

What is claimed is:

1. An extendable vehicle load floor mounting assembly for attachment to a vehicle cargo space floor having a plurality of factory bolt openings, the assembly comprising:
   a base frame;
   a plurality of bolt flanges carried by the base frame;
   a plurality of flange bolt openings in the bolt flanges, respectively;
   the flange bolt openings in the bolt flanges are configured to correspond in position to the factory bolt openings, respectively, in the vehicle cargo space floor;
   each of the flange bolt openings comprises a narrow portion and a wide portion communicating with the narrow portion;
   a plurality of bolts adapted for extension through the flange bolt openings and the factory bolt openings, respectively; and
   an extendable vehicle load floor slidably carried by the base frame.

2. An extendable vehicle load floor mounting assembly for attachment to a vehicle cargo space floor having a plurality of factory bolt openings, the assembly comprising:
   a base frame including a pair of generally elongated, parallel, spaced-apart slide rails each having a first rail end and a second rail end spaced-apart from the first rail end;
   a first pair of bolt flanges carried by the slide rails, respectively, generally at the first rail end;
   a first pair of flange bolt openings in the first pair of bolt flanges, respectively;
   a second pair of bolt flanges carried by the slide rails, respectively, generally at the second rail end;
   a second pair of flange bolt openings in the second pair of bolt flanges, respectively;
   the first pair of flange bolt openings and the second pair of flange bolt openings is configured to correspond in position to first and second pairs of the factory bolt openings, respectively, in the vehicle cargo space floor;
   a first pair of bolts adapted for extension through the first pair of flange bolt openings and the first pair of the factory bolt openings, respectively;
   a second pair of bolts adapted for extension through the second pair of flange bolt openings and the second pair of the factory bolt openings, respectively;
   an extendable vehicle load floor slidably carried by the base frame;
   a third pair of bolt flanges carried by the slide rails, respectively, generally at the middle frame member;
   a third pair of flange bolt openings in the third pair of bolt flanges, respectively, and configured to correspond in position to a third pair of the factory bolt openings, respectively, in the vehicle cargo space floor;
   a third pair of bolts adapted for extension through the third pair of flange bolt openings and the third pair of the factory bolt openings, respectively; and
   each of the first pair of flange bolt openings, the second pair of flange bolt openings and the third pair of flange bolt openings comprises a narrow portion and a wide portion communicating with the narrow portion.

3. The assembly of claim 2 further comprising a slide rail connecting member connecting the slide rails generally at the front rail end.

4. The assembly of claim 3 further comprising a rear frame member connecting the slide rails generally at the rear rail end.

5. The assembly of claim 4 further comprising a middle frame member connecting the slide rails between the front rail end and the rear rail end.

6. The assembly of claim 2 wherein the narrow portion is disposed closer to the first rail end and the wide portion is disposed closer to the second rail end.

7. An extendable vehicle load floor mounting method, comprising:
   providing a vehicle having a vehicle cargo space with a cargo space floor and factory bolt openings in the cargo space floor;
   providing a base frame having bolt flanges and flange bolt openings in the bolt flanges, the flange bolt openings in the bolt flanges are configured to correspond in position to the factory bolt openings, respectively, in the cargo space floor of the vehicle cargo space;

removing bolts from the factory bolt openings in the cargo space floor of the vehicle cargo space;

aligning the flange bolt openings in the bolt flanges with the factory bolt openings, respectively, in the cargo space floor;

extending the bolts through the flange bolt openings and the factory bolt openings, respectively;

securing the bolts in the factory bolt openings;

slidably mounting an extendable vehicle load floor to the base frame; and providing a base frame having bolt flanges and flange bolt openings in the bolt flanges comprises providing a base frame having bolt flanges and flange bolt openings each having a narrow portion and a wide portion communicating with the narrow portion.

8. The method of claim 7 wherein providing a vehicle having a vehicle cargo space with a cargo space floor and factory bolt openings in the cargo space floor comprises providing a pickup truck having a pickup truck bed.

9. The method of claim 7 wherein extending the bolts through the flange bolt openings and the factory bolt openings, respectively, comprises initially deploying the base frame in an unlocked position by extending the bolts through the wide portion of the flange bolt openings and then locating the bolts in the narrow portion of the flange bolt openings by sliding the base frame from the unlocked position to a locked position.

10. The method of claim 7 wherein slidably mounting an extendable vehicle load floor to the base frame comprises slidably mounting an extendable vehicle load floor to the base frame before extending the bolts through the flange bolt openings and the factory bolt openings, respectively.

* * * * *